(12) United States Patent
Shirley et al.

(10) Patent No.: US 9,669,963 B2
(45) Date of Patent: Jun. 6, 2017

(54) CAP FOR RECEPTACLE SUCH AS A BOTTLE

(71) Applicant: Dart Industries Inc., Orlando, FL (US)

(72) Inventors: Nathan E. Shirley, Orlando, FL (US); Hector J. Barea, Orlando, FL (US); Monica Vasquez, Orlando, FL (US); Christopher T. Reeves, Orlando, FL (US)

(73) Assignee: Dart Industries Inc., Orlando, FL (US)

( * ) Notice: Subject to any disclaimer, the term of this patent is extended or adjusted under 35 U.S.C. 154(b) by 111 days.

(21) Appl. No.: 14/746,965

(22) Filed: Jun. 23, 2015

(65) Prior Publication Data

US 2016/0376061 A1 Dec. 29, 2016

(51) Int. Cl.

| B65D 23/10 | (2006.01) |
|---|---|
| A45F 5/10 | (2006.01) |
| A45F 3/16 | (2006.01) |
| B65D 51/24 | (2006.01) |
| B65D 1/02 | (2006.01) |
| B65D 41/04 | (2006.01) |
| B65D 47/08 | (2006.01) |
| F16L 33/035 | (2006.01) |

(52) U.S. Cl.
CPC .............. *B65D 23/104* (2013.01); *A45F 3/16* (2013.01); *A45F 5/10* (2013.01); *B65D 1/02* (2013.01); *B65D 41/0407* (2013.01); *B65D 47/08* (2013.01); *B65D 51/242* (2013.01); *F16L 33/035* (2013.01)

(58) Field of Classification Search
USPC ....... 220/752, 741, 754, 755, 758, 759, 775, 220/778; 215/395, 396, 399, 307, 229; 294/27.1–27.28, 31.1, 31.2, 33; 24/20 TT, 16 R, 20 EE, 23 EE, 16 PB
See application file for complete search history.

(56) References Cited

U.S. PATENT DOCUMENTS

| 210,560 | A | * | 12/1878 | Robertshaw | .......... F16L 33/035 24/20 R |
|---|---|---|---|---|---|
| 751,009 | A | * | 2/1904 | Puterbaugh | .......... B65D 23/108 215/396 |
| 1,118,395 | A | * | 11/1914 | Campbell | .............. A47G 19/12 215/291 |
| 2,781,960 | A | * | 2/1957 | Dick | ....................... A47J 47/16 215/396 |
| 3,462,035 | A | * | 8/1969 | Grussen | ............... B65D 41/485 215/253 |
| 3,494,002 | A | * | 2/1970 | Kabel | .................... F16G 11/04 24/16 B |
| 3,548,906 | A | * | 12/1970 | Murphy | ................. B65D 33/06 16/406 |
| 3,722,932 | A | * | 3/1973 | Dougall | ................ E02F 9/2841 24/456 |

(Continued)

*Primary Examiner* — J. Gregory Pickett
*Assistant Examiner* — Gideon Weinerth
(74) *Attorney, Agent, or Firm* — Taylor J. Ross

(57) ABSTRACT

A cap for a receptacle such as a bottle, the cap comprising:
- a sealing portion for forming a substantially fluid-tight seal with an open end of the receptacle;
- a bracket formed on or with the cap, the bracket having an aperture therethrough; and
- at least one tab element received in or through said aperture, at least one of said tab element or elements forming a handle to be grasped by a user.

16 Claims, 5 Drawing Sheets

(56) References Cited

U.S. PATENT DOCUMENTS

| | | | | |
|---|---|---|---|---|
| 3,794,370 A * | 2/1974 | Lockhart | | A47J 45/077 |
| | | | | 16/DIG. 25 |
| 3,816,878 A * | 6/1974 | Fulton | | B65D 63/14 |
| | | | | 24/16 PB |
| 4,209,661 A * | 6/1980 | Pate | | F16G 11/04 |
| | | | | 174/659 |
| 4,267,653 A * | 5/1981 | Hahn | | E02F 9/2841 |
| | | | | 37/457 |
| 4,413,432 A * | 11/1983 | Bierwith | | E02F 9/2825 |
| | | | | 37/456 |
| 4,557,023 A * | 12/1985 | Six | | B65D 63/1072 |
| | | | | 24/16 PB |
| 4,943,017 A * | 7/1990 | Ennis | | A61J 9/0669 |
| | | | | 215/11.1 |
| 5,188,266 A * | 2/1993 | Loulias | | B65D 81/3876 |
| | | | | 224/148.2 |
| 5,409,151 A * | 4/1995 | Freimark | | A45F 3/16 |
| | | | | 215/228 |
| 5,413,261 A * | 5/1995 | Wu | | A45F 3/14 |
| | | | | 215/396 |
| 5,427,259 A * | 6/1995 | Krastanov | | A61J 9/0638 |
| | | | | 215/11.1 |
| 5,573,152 A * | 11/1996 | Arnold | | B65D 23/003 |
| | | | | 215/399 |
| 5,577,647 A * | 11/1996 | Pittarelli | | A45F 3/16 |
| | | | | 215/228 |
| 5,692,630 A * | 12/1997 | Hsu | | A47G 19/2272 |
| | | | | 215/11.1 |
| 5,954,247 A * | 9/1999 | Savine | | A45F 5/00 |
| | | | | 215/399 |
| 6,086,124 A * | 7/2000 | Wang | | A45F 3/14 |
| | | | | 215/396 |
| 6,138,882 A * | 10/2000 | Buettner | | A45C 13/00 |
| | | | | 190/102 |
| 6,266,852 B1 * | 7/2001 | Tai | | B65D 63/1027 |
| | | | | 24/16 PB |
| 6,443,338 B1 * | 9/2002 | Giacona, III | | A45C 13/30 |
| | | | | 224/148.6 |
| 6,533,148 B1 * | 3/2003 | Dahl | | A45F 3/14 |
| | | | | 224/148.6 |
| 6,571,429 B2 * | 6/2003 | Yeh | | A45F 5/00 |
| | | | | 24/16 PB |
| 6,581,886 B1 * | 6/2003 | Suh | | A61J 9/0692 |
| | | | | 248/102 |
| 6,719,951 B1 * | 4/2004 | Griffith | | A61B 10/007 |
| | | | | 215/396 |
| 6,837,472 B1 * | 1/2005 | Beutz | | A45F 3/16 |
| | | | | 224/148.4 |
| 6,962,265 B1 * | 11/2005 | Zhang | | A47G 19/22 |
| | | | | 220/754 |
| 7,404,534 B1 * | 7/2008 | Hajianpour | | A45F 5/02 |
| | | | | 224/419 |
| 7,614,532 B1 * | 11/2009 | Dague | | A45F 5/02 |
| | | | | 224/148.7 |
| D648,177 S * | 11/2011 | Eyal | | D7/510 |
| D663,209 S * | 7/2012 | Maas | | D7/510 |
| 8,240,525 B2 * | 8/2012 | Stojkovski | | A45F 5/02 |
| | | | | 224/148.4 |
| 8,246,095 B2 * | 8/2012 | Radle | | A45F 5/1026 |
| | | | | 24/16 R |
| D667,269 S | 9/2012 | Pallotto | | |
| 8,272,545 B1 * | 9/2012 | Saffran | | A45F 5/00 |
| | | | | 224/148.4 |
| D672,609 S * | 12/2012 | Aziz | | D7/507 |
| 8,371,244 B2 * | 2/2013 | Krasner | | A01K 7/00 |
| | | | | 119/72.5 |
| D699,516 S * | 2/2014 | Kim et al. | | D7/510 |
| D763,622 S * | 8/2016 | Shirley | | D7/511 |
| 2002/0084241 A1 * | 7/2002 | Yu-Hsien | | B65D 51/242 |
| | | | | 215/305 |
| 2002/0121456 A1 * | 9/2002 | Mannion | | A47F 5/04 |
| | | | | 211/113 |
| 2003/0079314 A1 * | 5/2003 | Yeh | | A45F 5/00 |
| | | | | 24/16 PB |
| 2003/0080165 A1 * | 5/2003 | Dahl | | A45F 3/14 |
| | | | | 224/148.6 |
| 2003/0088948 A1 * | 5/2003 | Cook | | F16L 3/14 |
| | | | | 24/16 PB |
| 2003/0111496 A1 * | 6/2003 | Abbott | | F16B 45/02 |
| | | | | 224/148.6 |
| 2003/0146254 A1 * | 8/2003 | Blondeel | | B65D 51/242 |
| | | | | 224/148.4 |
| 2004/0108346 A1 * | 6/2004 | Pablo | | A45F 5/02 |
| | | | | 224/251 |
| 2004/0217139 A1 * | 11/2004 | Roth | | A45F 3/18 |
| | | | | 224/148.7 |
| 2005/0109803 A1 * | 5/2005 | Shin | | A45F 3/16 |
| | | | | 224/148.4 |
| 2006/0012199 A1 * | 1/2006 | Slank | | F16L 3/233 |
| | | | | 294/150 |
| 2006/0130285 A1 * | 6/2006 | Lares | | F16L 33/035 |
| | | | | 24/16 PB |
| 2007/0221607 A1 * | 9/2007 | Piccioli | | B65D 23/106 |
| | | | | 215/396 |
| 2008/0078787 A1 * | 4/2008 | Yelland | | A45F 3/16 |
| | | | | 224/148.1 |
| 2010/0083469 A1 * | 4/2010 | Welker | | A45F 5/1026 |
| | | | | 16/425 |
| 2010/0140211 A1 * | 6/2010 | Becotte | | A63F 9/001 |
| | | | | 215/386 |
| 2010/0308006 A1 * | 12/2010 | Walker-Smith | | A45F 3/16 |
| | | | | 215/305 |
| 2013/0043264 A1 * | 2/2013 | Yang | | A45F 5/00 |
| | | | | 220/763 |
| 2013/0068718 A1 * | 3/2013 | Tai | | B65D 71/02 |
| | | | | 215/396 |
| 2013/0087525 A1 * | 4/2013 | Tai et al. | | B65D 67/02 |
| | | | | 215/396 |
| 2014/0339263 A1 * | 11/2014 | Schumacher | | B65D 83/388 |
| | | | | 222/175 |
| 2015/0289649 A1 * | 10/2015 | Perrin | | A47B 91/12 |
| | | | | 248/346.06 |

\* cited by examiner

CAP FOR RECEPTACLE SUCH AS A BOTTLE

CROSS REFERENCE TO RELATED APPLICATIONS

This application is related to co-pending Ser. No. 29/531,058, which is incorporated herein by reference.

STATEMENT REGARDING FEDERALLY SPONSORED RESEARCH

Not applicable.

BACKGROUND OF THE INVENTION

The present invention relates in general to receptacles such as bottles. In particular, the present invention relates to an improved cap which may be used to close a receptacle such as a bottle and which provides a handle for a user to grasp the bottle.

Refillable receptacles, such as bottles, are known in the art. Such bottles are provided with lids or caps to keep the bottle in a closed state when not being used. What is needed is an improved cap for a bottle which provides a comfortable and convenient way for a user to hold the bottle or attach it (for example) to a backpack or rucksack.

SUMMARY OF THE INVENTION

According to the present invention, there is provided a cap for a receptacle such as a bottle, the cap comprising: a sealing portion for forming a substantially fluid-tight seal with an open end of the receptacle; a bracket on or formed with the cap, the bracket having an aperture therethrough; and at least one tab element received in or through said aperture, at least one of said tab element or elements forming a handle to be grasped by a user.

Conveniently, the cap comprises a single tab element received in the aperture to form the handle.

Advantageously, the single tab element has a loop configuration having two ends and the ends of the loop are received in the aperture.

Preferably, the single tab element is molded or permanently formed into the loop configuration.

Alternatively, the single tab element is formed of a flexible material and the tab element is formed substantially flat.

Advantageously, the single tab element has regions of different material thickness so that when flexed, the relatively thinner regions tend to flex more than the relatively thicker regions, thereby forming a defined shape.

Conveniently, the two ends of the loop are engageable with each other to form a mutual connection.

Preferably, the two ends of the loop each comprise a saw-tooth surface which lock together to join the ends in the aperture.

Advantageously, the cap comprises first and second tab elements and each tab element comprises a saw-tooth arrangement which may engage with the other to lock together and join the tab elements in the aperture. The first tab element may comprise a stopper for the aperture.

Preferably, the second tab element comprises an attachment selected from a handle, strap, loop, keychain, pedometer, GPS device, key holder, emblem, figurine or mascot.

Conveniently, the sealing portion comprises a screw thread which is dimensioned and configured to form a screw fit with a corresponding screw thread located on the open end of the receptacle.

Alternatively, the sealing portion comprises a region dimensioned and configured to form a push fit with a corresponding region on the open end of the receptacle.

Preferably, the cap further comprises a spout for delivery of fluid therethrough.

Conveniently, the cap further comprises a spout cover.

Preferably, the spout cover is hingedly attached to the cap and forms an interference fit with the spout to reversibly seal the spout and prevent passage of fluid through the spout when in the sealed position.

Advantageously, the or each tab element comprises an abutment dimensioned and configured to substantially close the opening of the aperture.

The invention also provides a bottle having a cap according to the invention as described herein.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
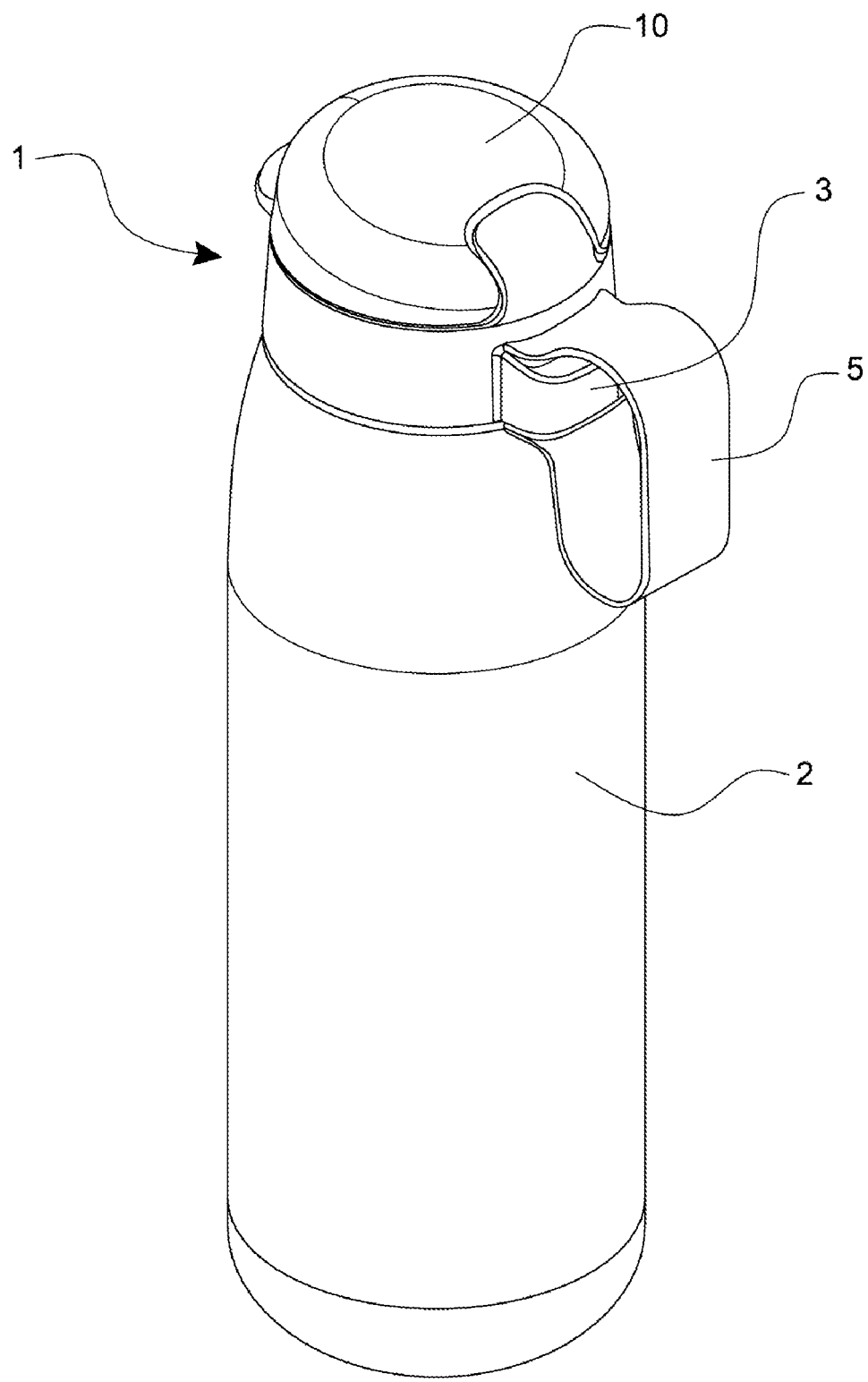
FIG. 1 is a perspective view of one embodiment of a cap according to the present invention, attached to a bottle.

With reference to FIG. 1 a cap for a receptacle such as a bottle is generally indicated by reference numeral 1. In the embodiment shown, the cap is attached to a suitable bottle 2. The bottle may be of a type known in the art manufactured from a plastics material such as polycarbonate and having a volume such as 325 ml, 500 ml, 750 ml, 1 l, 1.5 l or 2 l. The bottle shown is generally cylindrical in configuration, with a closed bottom end, open top end and neck region 7. Other bottle shapes such as rectangular bottles, are however also contemplated. As shown, the cap 1 of the invention in this embodiment includes a cover 10, which will be described later in more detail.

Figure 2:
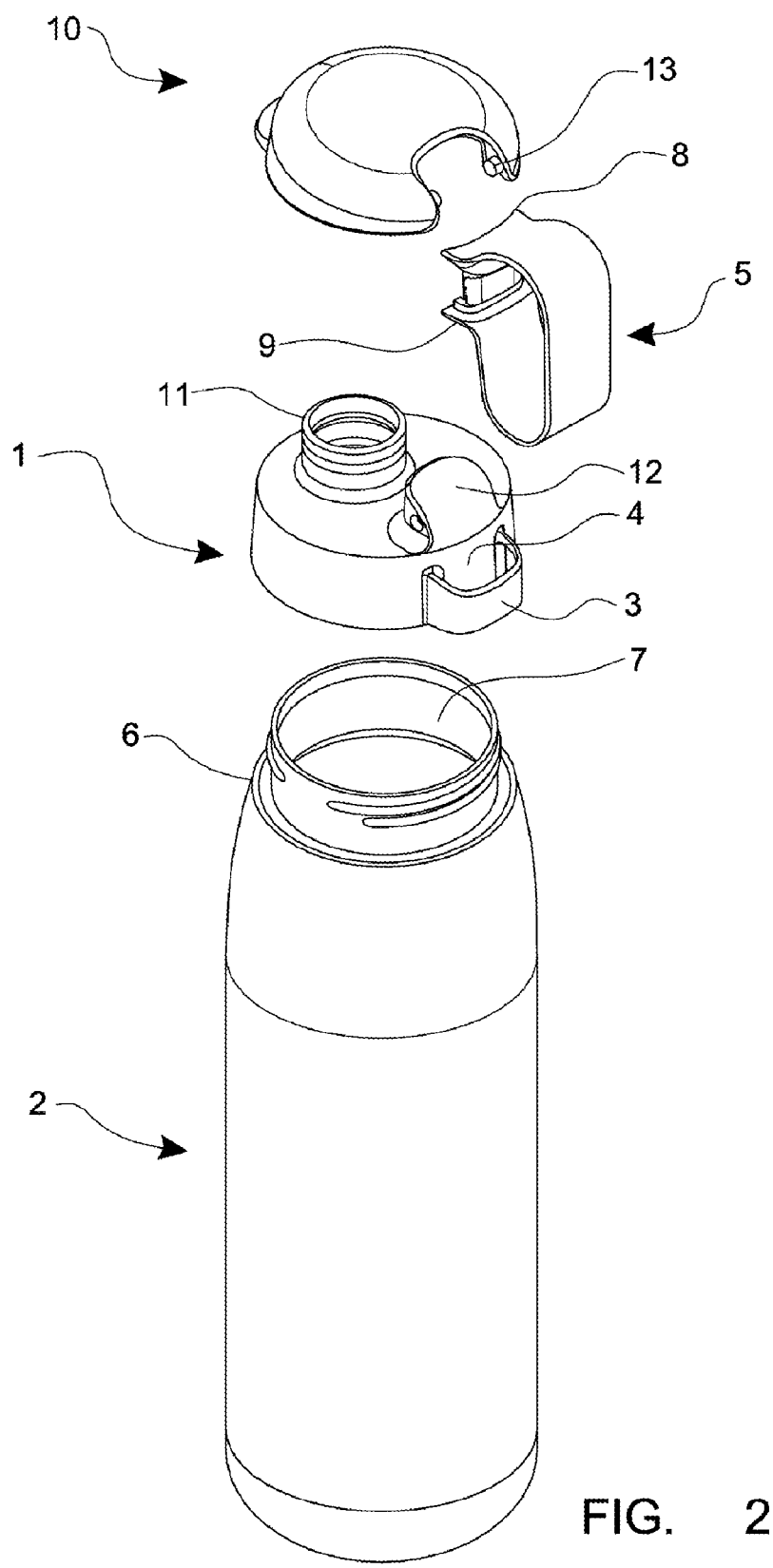
FIG. 2 is an exploded view of the cap and bottle of FIG. 1.

The cap 1 according to the invention is provided with a bracket 3 which extends radially outward from the cap 1 and provides an aperture extending generally vertically as shown i.e. an aperture 4 (see FIG. 2). The aperture 4 has an upper opening and lower opening and a passage therethrough.

As best illustrated by FIG. 2, the neck portion 7 of the bottle 2 is provided with a screw thread 6. As will be appreciated by one skilled in the art, the screw thread 6 on the bottle 2 is intended to mate with a corresponding screw thread on the interior surface of the cap 1 (not shown) thereby forming a substantially fluid-tight connection between bottle 2 and cap 1. While a screw thread is illustrated here, it is to be appreciated that other forms of connections are envisaged by the invention, such as a push-fit (interference fit) between the cap and the bottle or even a snap-fit of the type known in the art, although reversible connections such as a screw connection are preferred.

As depicted the neck 7 of the bottle 2 having the screw thread 6 is relatively wide as compared to the width of the bottle as a whole. The relatively wide neck 7 means that the bottle may easily be both refilled and emptied (contents poured out). While a cylindrical bottle 2 is illustrated, actually the bottle can take any shape, for example rectangular. However if a screw-fit connection to the cap 1 is used, the bottle needs to have a circular cross-section at least in the region of the screw-threads, to enable rotation.

Figure 3:
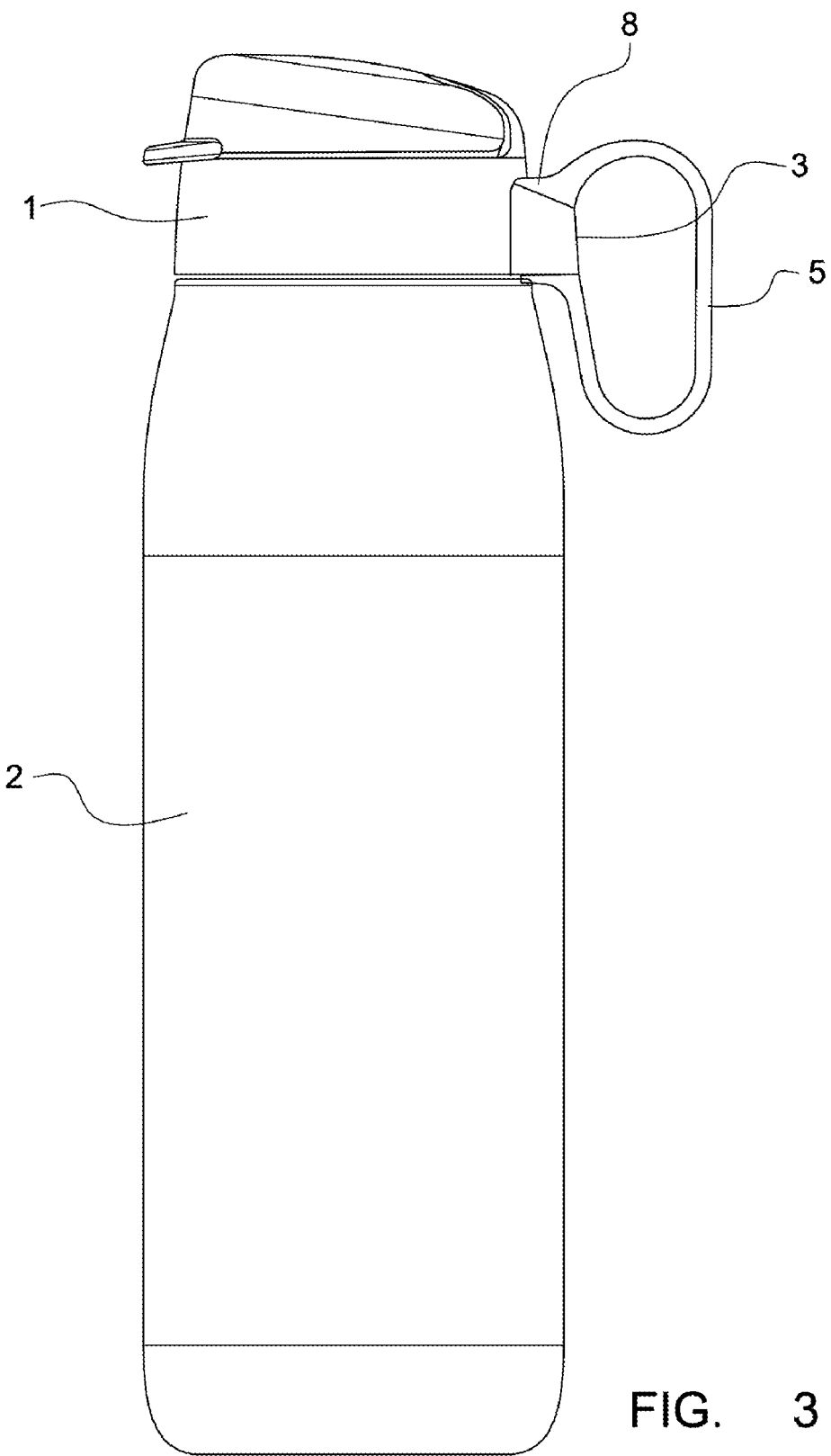
FIG. 3 is a side view of a cap according to one embodiment of the present invention, attached to a bottle.
Figure 4:
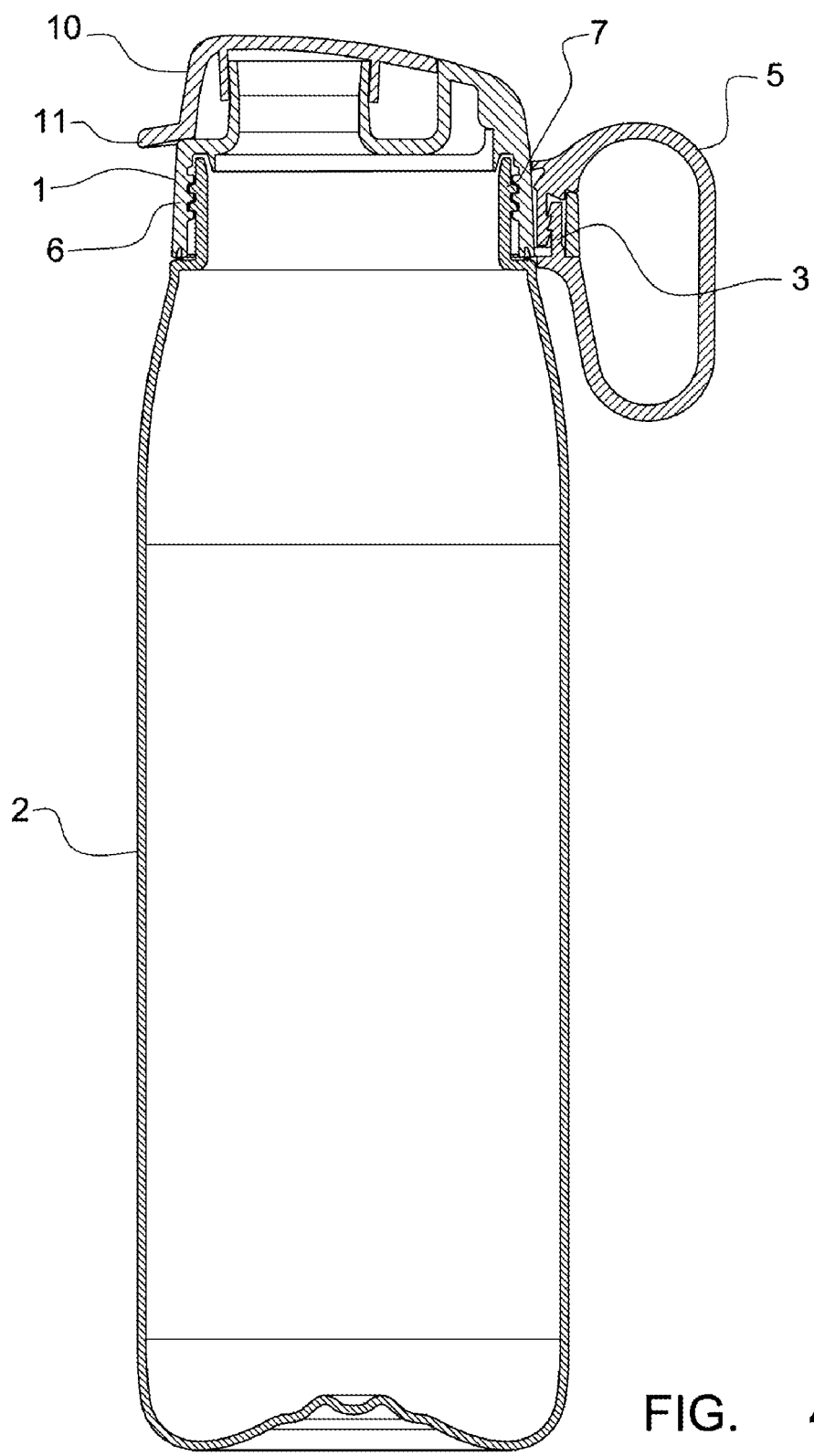
FIG. 4 is a cross section through the cap of the invention and bottle depicted in FIG. 3.

With further reference to FIG. 2, there is generally depicted with reference numeral 5 a tab element according to the invention. As depicted in FIG. 2, for the purpose of clarity only, the tab element 5 is exploded out of the cap 1. However, as shown in FIGS. 1, 3 and 4, in use the tab element 5 is located within the aperture 4 of the bracket 3. As is clear for example from FIG. 1, the tab element 5 provides a handle in the form of a loop for a user to grasp the bottle and cap assembly. Moreover, the looped configuration of the handle allows the bottle and cap assembly to be attached, for example by way of a carabiner or other attachment to another object such as a backpack or rucksack.

Figure 5:
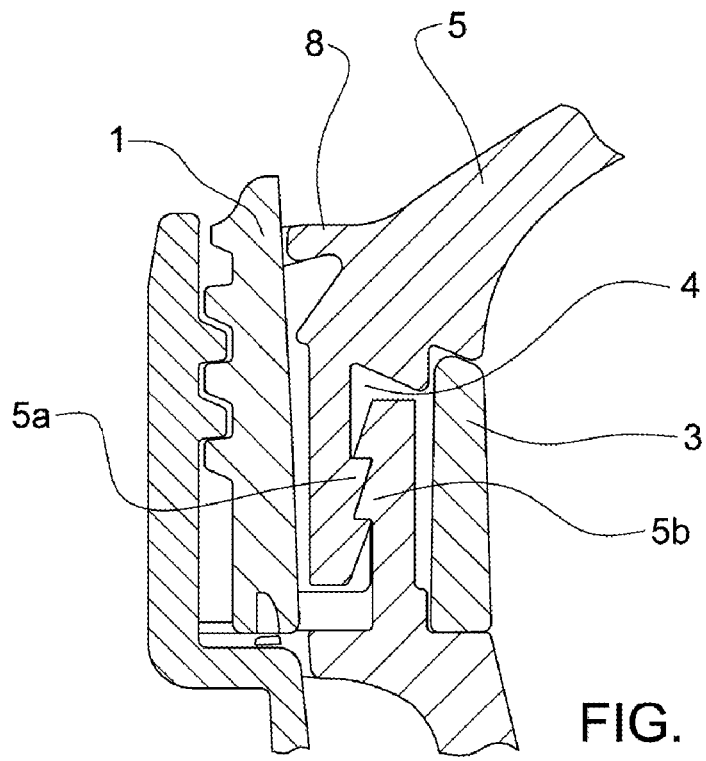
FIG. 5 is a detail side cross-sectional view along line "C" of FIG. 4.

In one embodiment of the invention, the cap includes a single tab element 5 which forms the handle. During assembly of the cap 1, the tab element 5, which may be manufactured of an elastomeric material, is inserted into the aperture 4 of the bracket 3. In fact, as shown in particular in FIGS. 4 and 5, the tab element 5 is a single piece having two ends, 5a and 5b. The two ends 5a and 5b each present a surface having a "saw-tooth" configuration, which surfaces match each other. In use, the two ends 5a and 5b of the tab element 5 are both inserted into the aperture 4, at opposite open ends of the aperture, and the two ends 5a and 5b of the tab element 5 lock together when the saw-tooth surfaces come into contact with each other (see in particular FIG. 5). It is preferable that the connection between the ends 5a and 5b is irreversible once formed, so that the handle cannot accidentally become dislodged from the cap or be removed by a user.

As may be seen in FIG. 1, the tab element 5 may be provided with abutments 8 and 9. These abutments are dimensioned and configured so as to be too large to insert through the aperture 4 of bracket 3. Accordingly, when the tab element 5 is connected to the bracket 3, as described in the preceding paragraph, the abutments 8 and 9 provide upper and lower limits respectively to the amount by which the tab element 5 may be inserted into the aperture 4.

Furthermore, the abutments 8 and 9 provide respective upper and lower covers to close off the openings to the aperture, thereby preventing ingress of dirt and preferably visually obscuring the connection between the tab ends 5a and 5b.

Returning to the tab element 5, when manufactured this may be molded in a flat configuration from a resilient or flexible material, preferably having areas of relatively increased material thickness which resist bending more than corresponding areas of lesser thickness. Therefore, when the tab element 5, molded flat in this way is bent, a particular curved shape of the tab element 5 will be formed depending on the location of the relatively thick and thin areas of material. In use, the flat tab element 5 is bent around until the ends 5a and 5b of the tab element meet in the aperture, forming a connection as already described.

Alternatively, in manufacture the tab element 5 may be molded already having substantially its final intended curvature, though the tab element 5 still needs to be flexible enough so that the tab ends 5a and 5b may be located in the aperture 4. As illustrated and readily seen for example in FIGS. 2, 4 and 5 the tab ends 5a and 5b, where the connection takes place, should preferably be substantially planar. This provides a better and more reliable connection between the saw-tooth surfaces, as compared to a curved configuration.

Returning now to FIGS. 1 and 2, as illustrated the cap 1 according to this embodiment of the invention also includes a spout 11 and a cover 10. Therefore, in this embodiment of the invention a liquid contained in the bottle 2 may be delivered to a user directly through the spout 11 without removing the cap 1 (e.g. by unscrewing in the embodiment illustrated). This means that the cap 1 of the invention can be used as a closure for example of a sports drink bottle, where the user would prefer to avoid repeatedly unscrewing the cap 1 to access the contents of the bottle 2. The cover 10 in this embodiment is attached to the cap 1 by way of a hinge arrangement 12 in which lugs 13 are engageable into apertures of the hinge 12 so that the cover 10 may be rotated off the spout 11. As shown in FIG. 4, the interior surface of the cover 10 is configured to engage and close the spout 11 in an interference fit so that when the cover 10 is in the closed position, liquid may not be delivered through the spout 11.

Alternatively, and not shown, the spout, cover and hinge may be absent so that the cap 1 of the invention simply closes the bottle 2 in a manner as described above, for example by way of a screw thread 6. In this embodiment, the user needs to remove the cap 1 completely before accessing the contents of the bottle 2. This kind of cap according to the invention may be suited, for example, to the storage of liquids in a refrigerator or in an office or conference environment where, unlike the sports bottle, immediate access to the contents of the bottle is not necessarily needed. Instead, the user may unscrew the cap 1 from the bottle 2 and pour the contents into a glass, for example. Nevertheless, this embodiment of the invention, not depicted, still includes the bracket 3, aperture 4 and tab elements 5 as described herein.

As depicted so far in FIGS. 1 to 5, the single tab element 5 has ends 5a and 5b which engage with each other to form a single unitary handle. However, in an alternative embodiment depicted in FIG. 6 it is also possible to provide two separate tabs 50 and 51 which each have the same saw-tooth surfaces and abutments as described above and which both connect together within the aperture 4 of the bracket 3 as previously described. As depicted, the lower tab 50 merely comprises a saw-tooth surface 50a and an abutment 52. The abutment 52 performs exactly the same function as described above, namely closing the lower opening of the aperture 4 and providing a limit to the amount that the tab 50 may be inserted into the aperture 4. The upper tab 51 also includes a saw-tooth surface 51a for engagement with the surface 50a as already described. Similarly, tab 51 includes an abutment 53 for closing the upper opening of the aperture 4.

Figure 6:
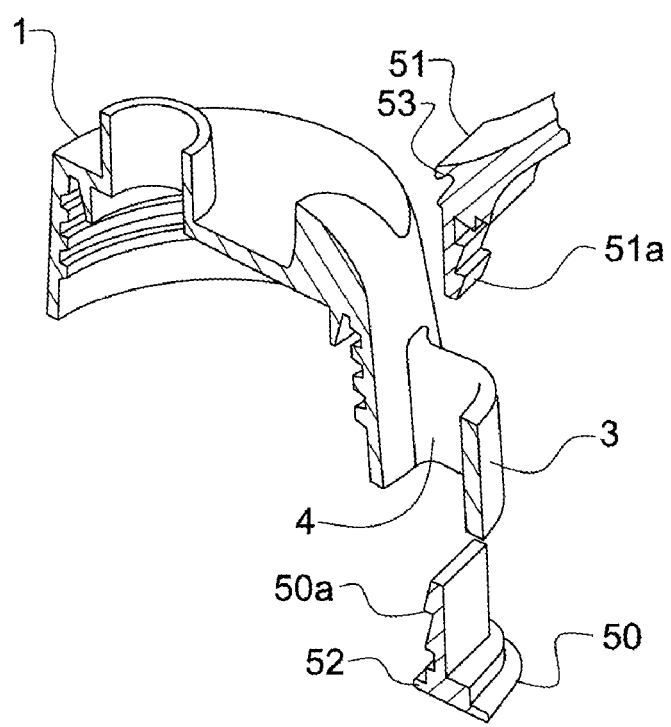
FIG. 6 is a perspective detail view of a cross-section through a cap according to a further embodiment of the invention.

As depicted in FIG. 6, the lower tab 50 merely acts as a stopper for the aperture 4 because tab 50 only includes an abutment 52. However, the upper tab 51 includes some form of attachment to the tab 51. This attachment may be a handle, strap or loop for a user to grasp the bottle or to attach the bottle and cap to something else, like a backpack. Alternatively, the attachment may be a further object or device, such as a GPS device, a key holder, a pedometer or an object including an emblem (for example relating to a sports team) or a mascot (for example a miniature figurine). The connection between tab 51 and the further object may not be direct. For example the tab 51 may be simply provided with a loop or carabiner for attachment to a GPS device.

As the skilled person will appreciate, it is also possible to reverse the positions of upper and lower tabs 51 and 50 respectively, so that the stopper closes the upper opening of the aperture 4 and the attachment is attached at the lower opening of the aperture 4.

Alternatively still, in a further embodiment (not shown) each tab 50 and 51 could comprise or be attached to some form of attachment, selected from the attachments mentioned above. Purely by way of example, one of the two tabs provided could be a handle or strap and the other of the tabs could be an emblem. Accordingly, multiple combinations of attachments are possible, depending on what is attached to the upper and lower tabs.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A cap for a receptacle such as a bottle, the cap comprising:
   a sealing portion for forming a substantially fluid-tight seal with an open end of the receptacle;
   a bracket formed on or with the cap, the bracket having an aperture therethrough; and
   at least one tab element received in or through said aperture, at least one of said tab element or elements forming a handle to be grasped by a user, wherein the at least one tab element comprises an abutment dimensioned and configured to substantially close the opening of the aperture.

2. A cap according to claim 1, the cap comprising a single tab element received in the aperture to form the handle.

3. A cap according to claim 2, wherein the single tab element has a loop configuration having two ends and wherein the ends of the loop are received in the aperture.

4. A cap according to claim 3, wherein the single tab element is molded, semi-permanently or permanently formed into the loop configuration.

5. A cap according to claim 3, wherein the single tab element is formed of a flexible material and wherein the tab element is formed substantially flat.

6. A cap according to claim 5, wherein the single tab element has regions of different material thickness so that when flexed, the relatively thinner regions tend to flex more than the relatively thicker regions, thereby forming a defined shape.

7. A cap according to claim 3, wherein the two ends of the loop are engageable with each other to form a mutual connection.

8. A cap according to claim 7 wherein the two ends of the loop each comprise a saw-tooth surface which may engage together to join the ends in the aperture.

9. A cap according to claim 1 comprising first and second tab elements wherein each tab element comprises a saw-tooth surface which engages with the other to lock together and join the tab elements in the aperture, preferably wherein the first tab element comprises a stopper for the aperture.

10. A cap according to claim 9 wherein the second tab element comprises an attachment selected from a handle, strap, loop, keychain, pedometer, GPS device, key holder, emblem, figurine or mascot.

11. A cap according to claim 1, wherein the sealing portion comprises a screw thread which is dimensioned and configured to form a screw fit with a corresponding screw thread located on the open end of the receptacle.

12. A cap according to claim 1, wherein the sealing portion comprises a region dimensioned and configured to form a push fit with a corresponding region on the open end of the receptacle.

13. A cap according to claim 1, wherein the cap further comprises a spout for delivery of fluid therethrough.

14. A cap according to claim 13 wherein the cap further comprises a spout cover.

15. A cap according to claim 14 wherein the spout cover is hingedly attached to the cap and forms an interference fit with the spout to reversibly seal the spout and prevent passage of fluid through the spout when in the sealed position.

16. A bottle having a cap according to claim 1.

* * * * *